US007015584B2

(12) United States Patent
Chow et al.

(10) Patent No.: US 7,015,584 B2
(45) Date of Patent: Mar. 21, 2006

(54) HIGH FORCE METAL PLATED SPRING STRUCTURE

(75) Inventors: Eugene M. Chow, Stanford, CA (US); David K. Fork, Los Altos, CA (US); Thomas Hantschel, Menlo Park, CA (US); Koenraad F. Van Schuylenbergh, Sunnyvale, CA (US); Christopher L. Chua, San Jose, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/615,653

(22) Filed: Jul. 8, 2003

(65) Prior Publication Data

US 2005/0006829 A1 Jan. 13, 2005

(51) Int. Cl.
*H01L 23/48* (2006.01)

(52) U.S. Cl. ...................... 257/773; 257/750; 257/735; 438/666

(58) Field of Classification Search .................. 257/41, 257/48, 735, 750, 773, E23.014, E23.043; 438/666

See application file for complete search history.

(56) References Cited

U.S. PATENT DOCUMENTS 3,842,189 A 10/1974 Southgate
3,952,404 A 4/1976 Matunami
4,189,342 A 2/1980 Kock (Continued)

FOREIGN PATENT DOCUMENTS

WO WO 99/18445 A1 4/1999

(Continued)

OTHER PUBLICATIONS

Zou et al., "Plastic Deformation Magnetic Assembly (PDMA) of Out-of-Plane Microstrutures: Technology and Application," IEEE Journal of Microelectromechanical Systems, vol. 10, No. 2, Jun. 2001, pp. 302-309.

(Continued)

*Primary Examiner*—George Fourson
*Assistant Examiner*—Julio J. Maldonado
(74) *Attorney, Agent, or Firm*—Bever, Hoffman & Harms, LLP; Patrick T. Bever

(57) ABSTRACT

Lithographically defined and etched spring structures are produced by various methods such that they avoid the formation of a plated metal wedge on an underside of the spring structure after release. A post is utilized to offset the spring from an underlying substrate by a distance greater than the thickness of the plated metal. A trench is etched into the substrate below the spring to provide clearance during deflection of the spring. Another spring includes a knee (bend) that provides the necessary clearance during deflection. A plating process is limited to the upper side of another spring. A released spring is used as a shadow mask for patterning resist that prevents wedge formation during plating. Various tip arrangements are disclosed that can be utilized with each spring structure

27 Claims, 8 Drawing Sheets

330 270 120 101 338 110 340
330 120 705 1038 101 108 1005B
1300 1355 1330 T1 101

U.S. PATENT DOCUMENTS 4,423,401 A 12/1983 Mueller
4,468,014 A 8/1984 Strong
4,821,148 A 4/1989 Kobayashi et al.
5,280,139 A 1/1994 Suppelsa et al.
5,399,232 A 3/1995 Albrecht et al.
5,414,298 A 5/1995 Grube et al.
5,465,611 A 11/1995 Ruf et al.
5,513,518 A 5/1996 Lindsay
5,515,719 A 5/1996 Lindsay
5,534,662 A 7/1996 Peacock et al.
5,612,491 A 3/1997 Lindsay
5,613,861 A 3/1997 Smith et al.
5,665,648 A 9/1997 Little
5,780,885 A 7/1998 Diem et al.
5,831,181 A 11/1998 Majumdar et al.
5,848,685 A 12/1998 Smith et al.
5,914,218 A 6/1999 Smith et al.
5,939,623 A 8/1999 Muramatsu et al.
5,944,537 A 8/1999 Smith et al.
5,959,516 A 9/1999 Chang et al.
5,960,147 A 9/1999 Muramatsu et al.
5,979,892 A 11/1999 Smith
6,011,261 A 1/2000 Ikeda et al.
6,117,694 A 9/2000 Smith et al.
6,184,065 B1 2/2001 Smith et al.
6,184,699 B1 2/2001 Smith et al.
6,194,774 B1 2/2001 Cheon
6,213,789 B1 4/2001 Chua et al.
6,249,039 B1 6/2001 Harvey et al.
6,252,175 B1 6/2001 Khandros
6,264,477 B1 7/2001 Smith et al.
6,290,510 B1 9/2001 Fork et al.
6,299,462 B1 10/2001 Biegelsen
6,352,454 B1 3/2002 Kim et al.
6,392,524 B1 5/2002 Biegelsen et al.
6,441,359 B1 8/2002 Cozier et al.
6,455,885 B1 9/2002 Lin
6,499,216 B1 12/2002 Fjelstad
6,505,398 B1 1/2003 Park
6,528,350 B1 3/2003 Fork
6,528,785 B1 3/2003 Nakayama et al.
6,556,648 B1 4/2003 Bal et al.
6,578,410 B1 6/2003 Israelachvili
2002/0013070 A1 1/2002 Fork et al.
2002/0040884 A1 4/2002 Hantschel et al.
2002/0047091 A1 4/2002 Hantschel et al.
2002/0055282 A1 5/2002 Eldridge et al.
2002/0079445 A1 6/2002 Hantschel et al.
2002/0164893 A1 * 11/2002 Mathieu et al. ............... 439/66
2003/0010615 A1 1/2003 Fork et al.

FOREIGN PATENT DOCUMENTS

WO WO 00/33089 A2 6/2000
WO WO 01/48870 A2 7/2001

OTHER PUBLICATIONS

Chen et al., “Nanostructure patterns written in polycarbonate by a bent optical fiber probe,” J. Vac. Sci. Technol. B 19(6), Nov./Dec. 2001, pp. 2299-2300.

Kim et al., “Realization of High-Q Inductors Using Wirebonding Technology,” School of Electronics Engineering, Ajou University, Korea, 4 pgs.

Datta, Madhav, “Microfabrication by electrochemical metal removal,” IBM J. Res. Develop. vol. 42, No. 5, Sep. 1998, pp. 655-669.

Larson, Lawrence E., ed., *RF and Microwave Circuit Design for Wireless Communications*, Artech House: Boston 1997, 8 pgs.

Zhang et al., “A MEMS nanoplotter with high-density parallel dip-pen nanolithography probe arrays,” IOP Publishing, Nanotechnology 13 (2002), pp. 212-217.

Craninckx et al., “A CMOS 1.8GHz Low-Phase-Noise-Voltage-Controlled Oscillator with Prescaler,” 1995 IEEE International Solid-State Circuits Conference, Digest of Technical Papers, pp. 266-268.

Rogner et al., “The LIGA technique-what are the new opportunities,” J. Micromech. Microeng. 2 (1992), pp. 133-140.

Young et al., “Monolithic High-Performance Three-Dimensional Coil Inductors for Wireless Communication Applications,” pp. 3.5.1-3.5.4.

Young et al., “A Low-Noise RF Voltage-Controlled Oscillator Using On-Chip High-Q Three-Dimensional Coil Inductor and Micromachined Variable Capacitor,” pp. 128-131.

Nguyen et al., “Si IC-Compatible Inductors and LC Passive Filters,” IEEE Journal of Solid-State Circuits, vol. 25, No. 4, Aug. 1990, pp. 1028-1031.

Chang et al., “Large Suspended Inductors on Silicon and Their Use in a 2-$\mu$m CMOS RF Amplifier,” IEEE Electron Device Letters, vol. 14, No. 5, May 1993, pp. 246-248.

Nguyen et al., “A 1.8-GHz Monolithic LC Voltage-Controlled Oscillator,” IEEE Journal of Solid-State Circuits, vol. 27, No. 3, Mar. 1992, pp. 444-450.

* cited by examiner

HIGH FORCE METAL PLATED SPRING STRUCTURE

FIELD OF THE INVENTION

This invention generally relates to stress-engineered metal films, and more particularly to photo lithographically patterned spring structures formed from stress-engineered metal films.

BACKGROUND OF THE INVENTION

Photolithographically patterned stress-engineered metal structures (e.g., spring probes) have been developed, for example, to produce low cost probe cards and to provide electrical connections between integrated circuits. A typical spring structure is formed from a stress-engineered (a.k.a. "stressy") metal film intentionally fabricated such that its lower/upper portions have a higher internal tensile stress than its upper/lower portions. The internal stress gradient is produced in the stress-engineered metal film by layering different metals having the desired stress characteristics, or using a single metal by altering the fabrication parameters. The stress-engineered metal film is patterned to form islands that are secured to an underlying substrate either directly or using an intermediate release material layer. When the release material (and/or underlying substrate) is selectively etched from beneath a first (free) portion, the free portion bends away from the substrate to produce a spring structure that remains secured to the substrate by an anchor portion. Such spring structures may be used in probe cards, for electrically bonding integrated circuits, circuit boards, and electrode arrays, and for producing other devices such as inductors, variable capacitors, and actuated mirrors. Examples of such spring structures are disclosed in U.S. Pat. No. 3,842,189 (Southgate) and U.S. Pat. No. 5,613,861 (Smith).

When used to form probe cards, such spring metal structures must exhibit sufficient stiffness to facilitate proper electrical connection between the probe (spring metal finger) and a corresponding contact pad on the device-under-test. Most stressy metal spring probes produced by conventional methods are fabricated from sputtered metal that is approximately one micron thick, which produces only a nominal stiffness capable of resisting a force of 0.1 to 0.2 grams (gmf). These stressy metal spring probes may provide sufficient stiffness to probe gold contact pads, but are not stiff enough to reliably probe aluminum pads. Gold pads can be readily probed with relatively weak spring probes because gold does not form a passivation layer that takes significant force to puncture. However, aluminum pads form a passivation layer that must be punctured by the tip of the spring probe in order to facilitate proper electrical connection. To repeatedly achieve electrical contact to aluminum, which is required for many integrated circuit probe card applications, deflection of the probes within their elastic region should absorb an expected force of several grams.

One method of increasing the stiffness of stressy metal spring probes is to increase the probe thickness. Using a linear spring model, the force (F) imparted by a stressy metal spring probe is roughly equal to the product of the vertically compressed deflection from the relaxed state (dZ) multiplied by its vertical stiffness (K). Sputtered stressy metal probes have been produced that achieve large vertical deflections (up to approximately 100 microns), but their corresponding vertical stiffness is limited by the relatively thin sputtered metal. One approach to increasing the probe thickness, and hence the probe stiffness, is to produce thicker stressy metal films. However, fabricating a spring probe entirely from stressy metal would require sputtering tens of microns of metal, which would be very time consuming and hence very expensive. A less expensive approach to generating a higher force is sputtering and releasing a relatively thin (and therefore less expensive) stressy metal probe structure, and then thickening the probe using a relatively inexpensive plating process. Plating a thick metal layer (a few microns) on the probe significantly increases probe stiffness, but could also decrease the maximum deflection (dZ). Maximum deflection is determined by the initial lift height and the fracture limit of the probe. Laboratory experiments have shown thick electroplated stiffened springs break or yield when deflected a significant fraction of their initial lift height. Soft plated metals such as gold break less readily than hard plated metals such as nickel. Failure typically occurs at the base (anchor portion) of the cantilevers, where plating forms a wedge that acts as a stress-concentrating fulcrum to pry the base away from the underlying substrate as the probe is deflected. The wedge forms because the thickness of the release layer formed under the stressy metal film (if used) is less than the thickness of the plated layer. This wedge limits the maximum force because it limits both the allowed thickness of the plating (K) and the maximum displacement (dZmax).

Accordingly, what is needed is a cost effective method for fabricating high force spring probes and other spring structures from stress-engineered metal films that are thick (stiff) enough to support, for example, large probing forces, but avoid the production of a wedge at the base (anchor portion) of the spring that has a tendency to pry the spring base off the substrate surface.

SUMMARY OF THE INVENTION

The present invention is directed to plated spring structures that avoid the problems associated with conventional spring structures, and to methods for producing such plated spring structures. In particular, the present invention is directed to various plated spring structures and fabrication methods that avoid the wedge formed by plated material on an underside of the spring probe adjacent to the substrate surface, thereby avoiding spring breakage due to the fulcrum/lever mechanism produced by the wedge when the tip of the spring structure is pressed downward toward the substrate.

According to an embodiment of the present invention, the anchor portion of a stressy metal spring structure is formed on a raised post structure extending from the substrate by a predetermined distance that provides sufficient clearance to prevent plated metal layer from forming a wedge between the spring structure and the substrate. That is, the predetermined distance between the upper surface of the post and the substrate offsets the anchor portion of the spring structure from an upper surface of the substrate by a distance greater than two or more times the thickness of the plated metal layer, thereby preventing the plated metal from forming a wedge. This arrangement facilitates the formation of thicker plating, which increases spring stiffness. In one specific embodiment, the post is a deposited/plated metal (e.g., copper or nickel), and a sacrificial material (e.g., silicon dioxide or silicon nitride) is formed around the post. The post and sacrificial layer are planarized, and then stressy metal is formed, etched, and released by removing the sacrificial layer. In another specific embodiment, the post is formed from a portion of the sacrificial layer that is protected by a mask during the release etch, and includes an optional metal plating. In yet another specific embodiment, the post is conductive (or covered with a conductive material), and is coupled to an electrode during the plating process such that a curved plated metal structure forms on a side of the post. In yet another specific embodiment, a separate release material is formed on the planarized sacrificial layer/post before sputtering the stressy metal layer. In yet another specific embodiment, a seed material is formed on the release spring structure before plating.

According to another embodiment of the present invention, the anchor portion of a stressy metal spring structure is formed on a substrate, a trench is isotropically etched into the substrate adjacent to the anchor portion, and a plated metal layer is formed on both sides of a curved free portion of the spring structure that extends over the trench. To prevent the plated metal layer from forming a wedge between the spring structure and the substrate, the trench is etched to a depth that is greater than a thickness of the plated metal layer. In one specific embodiment, a stressy metal layer is sputter deposited and formed over an upper surface of the substrate, and the upper surface is then subjected to an isotropic etching step that releases both the free portion of the spring structure and forms the trench. In another specific embodiment, the stressy metal layer is formed on the upper surface of the substrate, and the substrate is isotropically etched through its bottom surface to release the spring structure and form the trench (through hole). In another specific embodiment, an electrode provided in a via formed in the substrate, and is coupled to a voltage source during the plating process.

According to yet another embodiment of the present invention, a spring structure includes an intermediate portion forming a knee between the anchor and free portions of the spring metal finger. In one specific embodiment, the knee is formed by sputtering the stressy metal over a sacrificial layer formed with a tapered edge such that the anchor portion is formed over an exposed portion of the substrate, an angled section is formed on the tapered edge, and the unreleased free portion is formed on a planarized surface of the sacrificial layer. The sacrificial layer is then etched and the free portion is released, whereby a fixed end of the free portion is maintained at a predetermined distance from the substrate by the intermediate portion to provide clearance for subsequent plating. In a second specific embodiment, a spring metal island is formed in a single plane over the substrate (no sacrificial layer), and a stress-balancing pad (i.e., having an internal stress gradient opposite to that of the spring metal) is formed over a selected portion of the spring metal island. During subsequent release, the stress-balancing pad causes the released free portion to form a knee at the junction between an intermediate portion and a free portion of the spring metal finger, thereby providing clearance for subsequent plating.

According to another embodiment of the present invention, wedge structures are prevented by plating only the upper side of the released spring structure. In one specific embodiment, single-sided plating is achieved by forming a spring structure using a low-conductivity or non-conductive spring material, and then depositing a conductive seed layer on the unreleased spring structure. The seed layer facilitates subsequent plating only on the upper surface of the released spring structure. In a specific embodiment, the seed material is formed along a central region of the spring metal to prevent plating material from forming along the edges of the released spring structure. In another specific embodiment, a thin non-plating (plating-resistant) layer (e.g., a dielectric) is formed between the spring metal and the release layer that resists plating on the lower surface of the release spring structure.

According to another embodiment of the present invention, a fabrication process is used in which the released spring finger acts as a shadow mask for patterning resist that prevents wedge formation during plating. In particular, prior to electroplating, the released spring finger is used as a mask to form a resist pattern under the free portion of the spring metal finger adjacent to the anchor portion (the resist is removed from all other surfaces). During the subsequent plating process, the resist pattern prevents plating material from accumulating on the underside of the spring finger adjacent to the anchor portion, thereby preventing the formation of a wedge structure.

According to an aspect of the present invention, spring probes formed using each of the embodiments described above are provided with relatively sharp tips that increase the contact pressure for a given probing force. In one specific embodiment, sharpened tips are generated by restricting the amount of electroplating formed at the probe tip by limiting or omitting seed material at the probe tip, or by exploiting the properties of plating rates on pointy shapes (electroless deposition can, for example, fall to zero at the surface of a spring tip). In another embodiment, probe tips are sharpened after plating using known techniques. In yet another specific embodiment, multiple probe tips (both in-plane and out-of-plane are formed on each spring probe to increase the probability of making electrical contact through redundancy.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
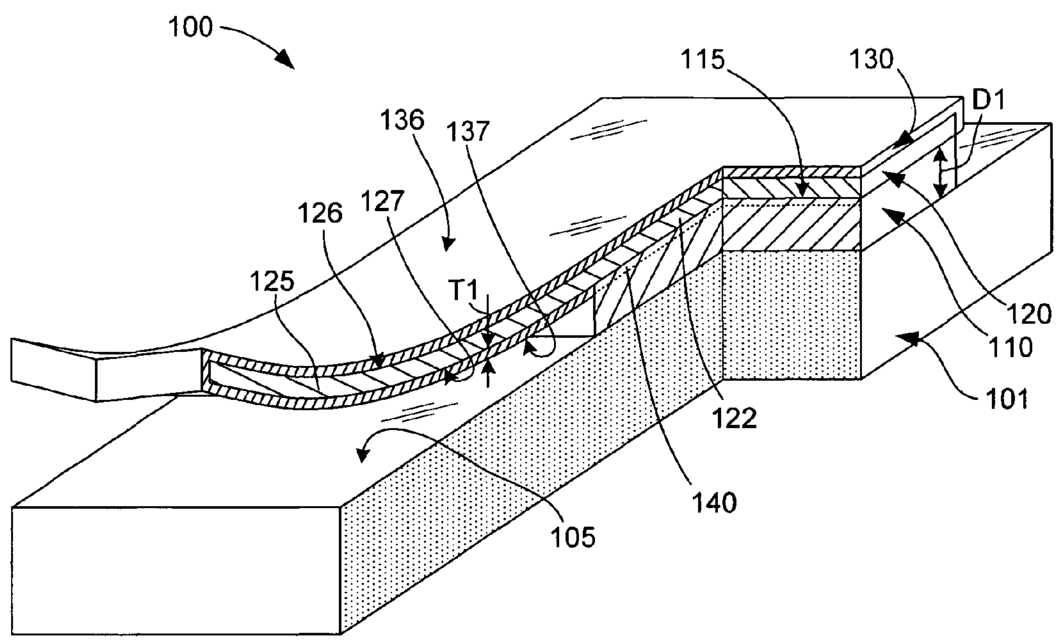
FIG. 1 is a cut-away perspective view of a high force metal plated spring structure according to an embodiment of the present invention.

FIG. 1 is a cut-away perspective view showing a spring structure 100 formed on a substrate 101 according to a first embodiment of the present invention. Spring structure 100 includes a post structure 110 formed on a (first) surface 105 of substrate 101, a spring metal finger 120 having an anchor portion 122 attached to an upper surface 115 of post structure 110, and a bent free portion 125 extending over substrate 101, and a plated metal layer 130 formed on spring metal finger 120. Substrate 101 is formed from a suitable (first) material (e.g., glass, silicon, or quartz), and post 110 is formed thereon from a second material (e.g., silicon dioxide, silicon nitride, copper (Cu), or nickel (Ni)). Post 110 can be plated or left unplated. Similar to conventional spring structures, spring metal finger 120 is etched from a stress-engineered metal film that is formed by DC magnetron sputtering one or more metals using gas (e.g., Argon) pressure variations in the sputter environment during film growth in accordance with known techniques. In some embodiments, a plating electrode and/or release material layer (indicated by dashed line region 140) is formed between surface 105 of substrate 101 and a lower surface of spring metal finger 120. Plated metal layer 130 (e.g., Ni, gold (Au), Cu, palladium (Pd), tin (Sn) solder, rhodium (Rh) and/or alloys thereof) is formed on exposed surfaces of spring metal finger 120 after free portion 125 is released, thereby providing structural and electrical characteristics that are superior to spring structures that are formed without plated metal. In particular, as indicated in FIG. 1, plating metal layer 130 includes an upper layer 136 formed on an upper surface 126 of spring metal finger 120, and a lower layer 137 formed on a lower surface 127 of free portion 125. In one embodiment, plated metal layer 130 is formed to a thickness T1 (e.g., 1.5 microns) using electroplating techniques (although electroless plating techniques may also be used).

According to an aspect of the present invention, post 110 extends from surface 105 of substrate 101 such that upper surface 115 is displaced from surface 105 by a predetermined distance D1 that is greater than thickness T1 of plated metal layer 130, thereby preventing the formation of a wedge that can pry spring structure 100 from substrate 101 during use. Preferably, post height D1 is two or more times greater than plating thickness T1. In one practical embodiment, plating thickness T1 is 1.5 microns, and predetermined distance D1 is 5 microns. Because post 110 elevates anchor portion 122 of spring metal finger 120 by an amount greater than thickness T1, sufficient clearance is provided to preclude a relatively thick layer of plating material formed on lower surface 127 from forming a wedge during actuation of spring structure 100. Accordingly, the present invention facilitates the formation of thicker plated metal layers 130, and hence thicker and stiffer spring structures. Further, utilizing post 110 increases the maximum deflection (dz-max) of spring structure 100 by an amount substantially equal to predetermined distance D1 (i.e., in additional to the displacement caused by bending). Accordingly, because increasing the product of stiffness and maximum elastic deflection increases the total exertable force, the present invention provides a high force spring structure 100 that is suitable for many probing and contact applications.

FIGS. 2(A) through 2(D) are simplified cross-sectional side views showing a simplified fabrication process or producing spring structure 100 according to a specific embodiment of the present invention.

Figure 2A:
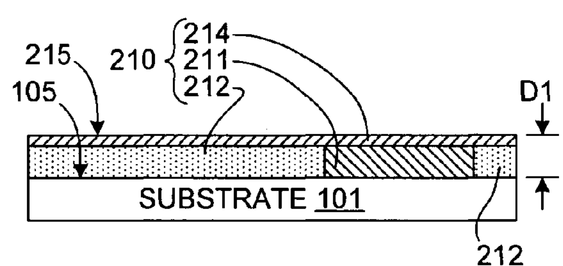
FIGS. 2(A), 2(B), 2(C), and 2(D) are cross-sectional side views showing fabrication steps associated with the production of the spring structure shown in FIG. 1.

Referring to FIG. 2(A), the fabrication method begins with the formation of a base layer 210 over surface 105 of substrate 101. Base layer 210 includes a post region 211 surrounded by sacrificial material (first) regions 212, and an optional release material/plating electrode layer 214 formed over post region 211 and sacrificial material regions 212. Base layer 210 defines a upper surface 215 that is a predetermined first distance D1 (e.g., 5 microns) above surface 105 of substrate 101.

According to an aspect of the present invention, post region 211 and sacrificial material region 212 may be formed using different materials, or formed using a continuous layer of a single material. Requirements for sacrificial material region 212 are that the sacrificial material can be uniformly deposited as a layer (typically approximately 5 microns), isotropically etched without disturbing the stressy metal film and post structures, and planarized with post 211. Exemplary sacrificial layers include, silicon dioxide or silicon nitride (chemical vapor deposition), polyimide, spin on glass, and SU-8. Requirements for post 211 are that it can be etched, plated, or deposited with lateral isolation sufficient for the selected probe density, uniformly deposited as a thick layer (typically approximately 5 mm), planarized with the sacrificial layer, and sufficiently conductive for the particular probing application. Exemplary post layers include plated copper or nickel. In one embodiment, base layer 210 is formed by depositing a thick oxide (sacrificial) layer, then forming (e.g., using well-known lithographic patterning techniques) one or more vias through the thick oxide layer for forming post 211. In one embodiment, post 211 is plated from a seed layer that is deposited before or after the thick sacrificial layer deposition. After post 211 is formed, a planarization step such as chemical mechanical polishing is optionally performed. Currently, copper and oxide are standard materials to polish as they are used in integrated circuit Damascene processes.

After forming post 211 and sacrificial material region 212, optional plating electrode/release layer 214 is deposited. Titanium (e.g., 0.2 microns) is typically used as a release material because it can be deposited in the same sputter tool as the subsequent metals utilized to form the stressy metal film. In one embodiment, gold is deposited on the titanium to act as a seed layer for subsequent electroplating.

Figure 2B:
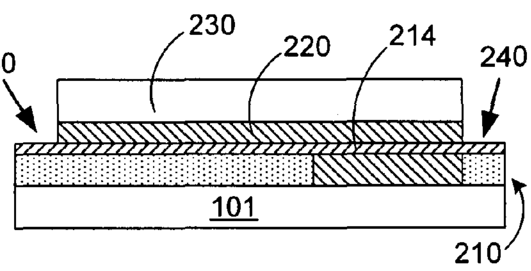

FIG. 2(B) shows a spring metal island 220 formed on release material layer 214, which is etched from a metal film formed using a mask 230 and an etchant 240 according to known processing techniques.

In one embodiment, the stress-engineered film used to from spring metal island 220 is formed such that its lowermost portions (i.e., adjacent to release material layer 214) has a lower internal tensile stress than its upper portions, thereby causing the stress-engineered metal film to have internal stress variations that cause a spring metal finger to bend upward away from substrate 101 during a release process (discussed below). Methods for generating such internal stress variations in stress-engineered metal film 220 are taught, for example, in U.S. Pat. No. 3,842,189 (depositing two metals having different internal stresses) and U.S. Pat. No. 5,613,861 (e.g., single metal sputtered while varying process parameters), both of which being incorporated herein by reference. In one embodiment, which utilizes a 0.2 micron Ti release material layer 214, stress-engineered metal film 220 includes Molybdenum and Chromium (MoCr) sputter deposited to a thickness of 1 micron. In other embodiments, a Mo spring metal layer can be formed on SiN release material layers.

Note also that an optional passivation metal layer (not shown; e.g., Au, Pt, Pd, or Rh) may be deposited on the upper surface of the stress-engineered metal film to act as a seed material for the subsequent plating process if the stress-engineered metal film does not serve as a good base metal. The passivation metal layer may also be provided to improve contact resistance in the completed spring structure. In an alternative embodiment, a NiZr stressy metal film may be utilized that can be directly plated without a seed layer. If electroless plating is used, the deposition of the electrode layer can be skipped.

Elongated spring metal (first) mask 230 (e.g., photoresist) is then patterned over a selected portion of the stress-engineered metal film, and exposed portions of the stress-engineered metal film surrounding the spring metal mask 230 are etched using one or more etchants 240 to form spring metal island 220. In one embodiment, the etching step may be performed using, for example, a wet etching process to remove exposed portions of the stress-engineered metal film. This embodiment was successfully performed using cerric ammonium nitrate solution to remove a MoCr spring metal layer. In another embodiment, anisotropic dry etching is used to etch both stress-engineered metal film 220 and the upper surface of electrode/release layer 214. This embodiment may be performed, for example, with Mo spring metal, and Si or Ti release layers. Mo, Si and Ti all etch in reactive fluorine plasmas. An advantage of dry etching the spring metal film is that it facilitates finer features and sharper tipped spring metal fingers. Materials that do not etch in reactive plasmas may still be etched anisotropically by physical ion etching methods, such as Argon ion milling. In yet another possible embodiment, the etching step can be performed using the electro-chemical etching process described in IBM J. Res. Dev. Vol. 42, No. 5, page 655 (Sep. 5, 1998), which is incorporated herein by reference. Many additional process variations and material substitutions are therefore possible and the examples given are not intended to be limiting.

Figure 2C:
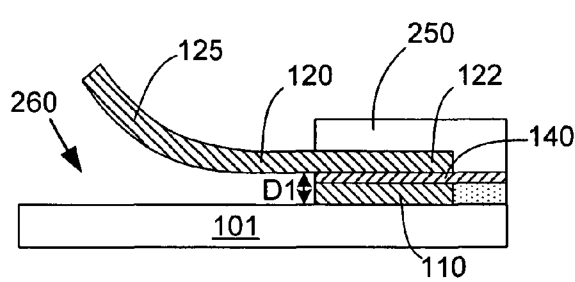

FIG. 2(C) depicts a release operation during which sacrificial material and/or release material are selectively removed from beneath free portion 125 of the spring metal island using one or more release etchants 260 (e.g., a buffered oxide etch), thereby causing free portion 125 to bend upward (away from substrate 101) to form spring metal finger 120. Note that anchor portion 122 remains connected to substrate 101 by way of post 110 (i.e., post portion 211, which is exposed during the release operation). As indicated in FIG. 2(C), the release operation utilizes a release mask 250 formed over anchor portion 122 of spring metal finger 120. Release mask 250 is used to pattern a release window in the electrode/release material layer, as well as provide electrical continuity within the release layer so that it can act as a common plating electrode for the entire substrate. In one embodiment, the exposed release material is etched and the cantilevers release and curl out of the plane. The resist forming release mask 250 is then reflowed over the edges of the etched release material to prevent unwanted plating during the subsequent electroplating process (discussed below). Next, exposed portions of sacrificial material region 212 are etched isotropically using, for example, hydrofluoric acid to form a clearance underneath the released spring.

Figure 2D:
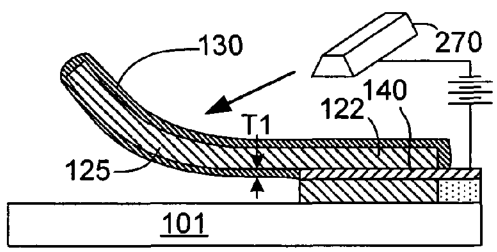

FIG. 2(D) depicts an electroplating process during which plated metal layer 130 is formed on exposed surfaces of spring metal finger 120, wherein plated metal layer 130 has a thickness T1 that is smaller than first predetermined distance D1 (see FIGS. 1 and 2(A)). In one embodiment, plated metal layer 130 is formed through release mask 250 (FIG. 2(C)) using either electroless plating techniques or electroplating techniques. However, electroplating is preferred due to simplicity, cost, and material quality. Spring metal finger 120 may be thought of as a scaffold or skeleton upon which additional material (i.e., plated metal layer 130)

is added by plating. In one embodiment, electrode/release material portion 140 (which is located under anchored portion 122) is utilized to facilitate electroplating by providing a suitable common electrical path for the electroplating cathode. Electroplating is performed, for example, using a metal source 270 (e.g., Ni, Au, Cu, Pd, Sn solder, Rh and/or alloys thereof) and known parameters. More than one of these metals may be plated in succession (e.g., Ni for stiffness followed by Au for passivation). In an alternative embodiment the electrical (cathode) connection can be made directly to spring metal finger 120.

Figure 3:
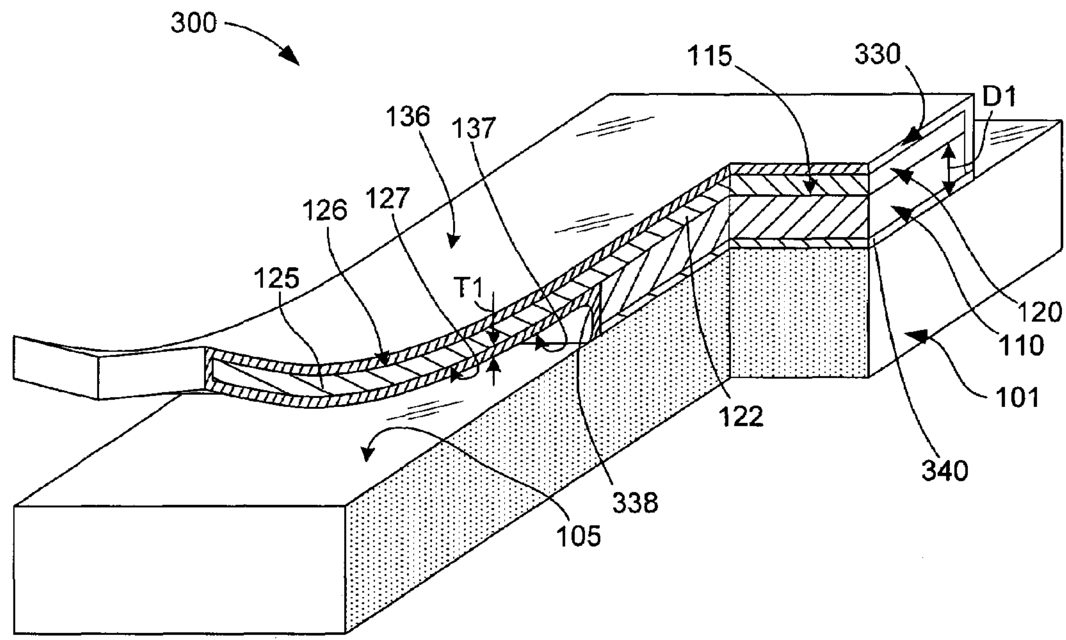
FIG. 3 is a cut-away perspective view of a high force metal plated spring structure according to an alternative embodiment.

FIG. 3 is a cut-away perspective view showing a spring probe (structure) 300 formed on substrate 101 according to another embodiment of the present invention. Elements of spring structure 300 that are similar to those described above are identified with like reference numbers.

Similar to spring probe 100, spring structure 300 includes a post structure 110 formed on substrate 101, a spring metal finger 120 having an anchor portion 122 attached to an upper surface 115 of post structure 110, and a bent free portion 125 extending over substrate 101, and a plated metal layer 330 formed on spring metal finger 120. Spring structure 300 is distinguished from spring probe 100 in two main respects: first, post 110 is formed on a plating electrode layer 340; and second, plated metal layer 330 extends down the sides of post 110 to form a curved plating structure 338 extending from surface 105 of substrate 101 to free portion 125 of spring metal finger 120. The formation of curved plating structure 338 during electroplating necessarily requires that post 110 be formed from a conductive material, or a seed layer and plated layer can be deposited on an electrically non-conducting post material. For high-density probing applications, it is important that the minimum spacing between conducting posts does not limit the overall probe density. Curved plating structure 338 distributes and reduces maximum stresses produced when spring probe 300 is deflected toward substrate 101 during probe operations, thereby preventing premature breaking of spring probe 300.

Figure 4A:
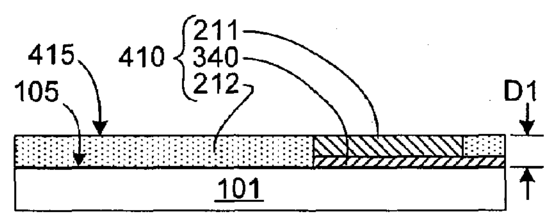
FIGS. 4(A), 4(B), 4(C), and 4(D) are cross-sectional side views showing fabrication steps associated with the production of the spring structure shown in FIG. 3 according to a first specific embodiment.
Figure 4B:
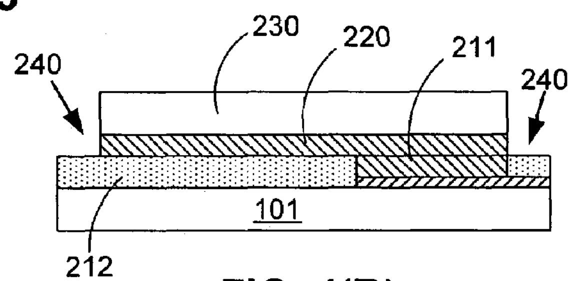
Figure 4C:
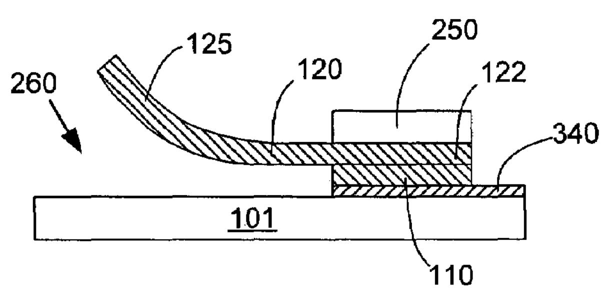
Figure 4D:
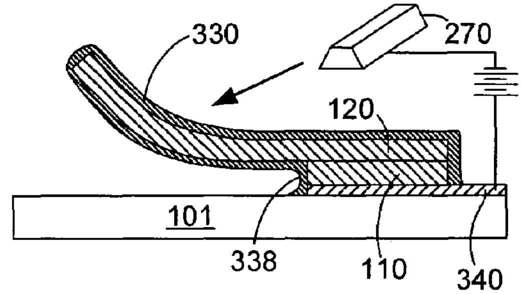

FIGS. 4(A) through 4(D) are simplified cross-sectional side views showing a simplified fabrication process or producing spring probe 300 according to a specific embodiment of the present invention. Referring to FIG. 4(A), the fabrication method begins with the formation of a base layer 410 that includes forming a plating electrode 340 (e.g., copper), and then forming post structure 211 and sacrificial material region 212 using the methods described above. Note again that upper surface 415 is planarized to facilitate the formation of the stressy metal film, and that base layer 410 is formed to the predetermined thickness D1. FIG. 4(B) shows the formation of spring metal island 220 on post 211 and sacrificial material region 212 using mask 230, as described above. FIG. 4(C) depicts the release of free portion 125, forming spring metal finger 120. Note that sacrificial material, which is removed by release etchant 250, serves as the release material in the present embodiment. Note also that release mask 250 may be omitted if post 250 is not etched by etchant 250. Finally, as indicated in FIG. 4(D), plated metal layer 330 is formed on spring metal finger 120 by coupling plating electrode 340 to the cathode of the plating system, thereby causing plating material to leave target 270 and attach to spring metal finger 120. During the plating process, the thick plated metal layer 330 tends to blunt sharp corners, so the area underneath free portion 125 adjacent to post 110 tends to form curved plating structure 338, which distributes stress and reduces the peak stress during subsequent probe deflection below the fracture strength. After the plating process is completed, plating electrode 340 can cleared to electrically isolate spring probe 300 from adjacent probes. It is also possible to have patterned metal underneath the post for electrical routing. This metal layer could be underneath the plating electrode and would remain in place after clearing the plating electrode.

Figure 5A:
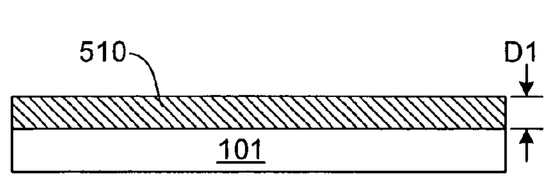
FIGS. 5(A), 5(B), 5(C), and 5(D) are cross-sectional side views showing fabrication steps associated with the production of a spring structure similar to that shown in FIG. 3 according to another specific embodiment.
Figure 5B:
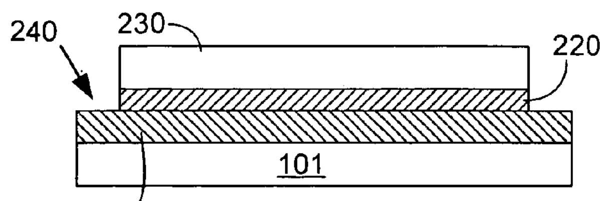
Figure 5C:
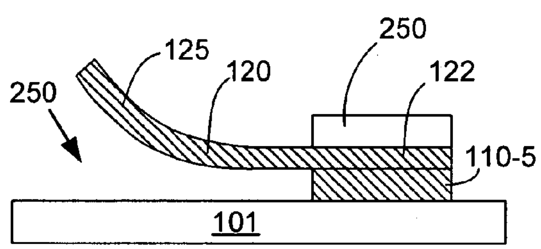
Figure 5D:
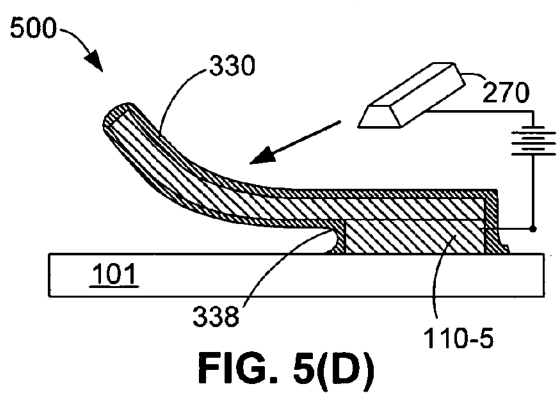

FIGS. 5(A) through 5(D) are simplified cross-sectional side views showing a simplified fabrication process or producing spring probe (structure) 500 (see FIG. 5(D)) according to another specific embodiment of the present invention that utilizes a single base layer material to form both the post and sacrificial material regions. Referring to FIG. 5(A), base layer 510 is formed to a thickness D1, and is formed form a material meeting the same requirements as those used to form the separate post and sacrificial material structures utilized in the embodiments described above, with the additional requirement of being able to be laterally etched so as to undercut and release the spring metal finger (FIG. 5(C)). Base layer 510 is preferably a metal deposited using sputtering/evaporation and/or plating. In one embodiment, a very thick titanium layer (approximately 5 microns) is sputtered to form base layer 510, which is wet etched during release (FIG. 5(C)). The resulting conductive post 110-5 could be used as a plating electrode during the formation of plated metal layer 330 (FIG. 5(D)). If compatible with plating chemistry, the post could also be used as a plating seed layer to form curved plated surface 338 under the spring base.

Figure 6A:
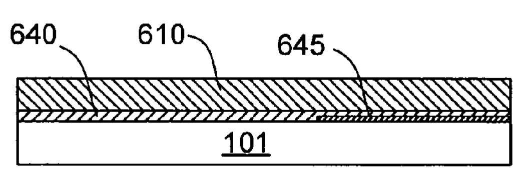
FIGS. 6(A), 6(B), 6(C), 6(D), and 6(E) are cross-sectional side views showing fabrication steps associated with the production of a spring structure similar to that shown in FIG. 3 according to another specific embodiment.
Figure 6B:
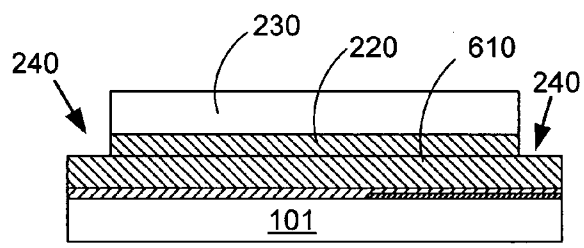
Figure 6C:
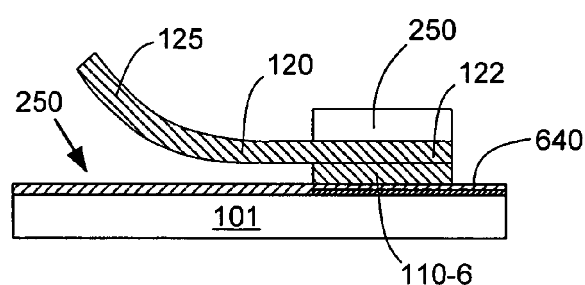
Figure 6D:
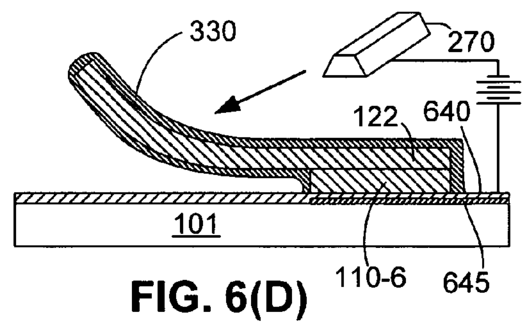
Figure 6E:
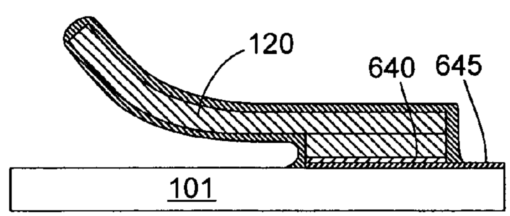

FIGS. 6(A) through 6(E) depict a variation to the fabrication method shown in FIGS. 5(A) through 5(D) in which separate layers are utilized for the release layer and the plating electrode. Referring to FIG. 6(A), a separate plating electrode 640 and a separate signal routing electrode 645 are formed/patterned below a thick release (base) layer 610, which is formed as described above. The spring island is then formed over base layer 610 (FIG. 6(B)) in the manner described above, and the spring metal finger 120 is formed by removing the sacrificial portion of the base layer (FIG. 6(C)). Plating electrode 640 is then contacted by the cathode of the plating system (FIG. 6(D)) and all exposed surfaces of spring metal finger 120 are electroplated with reinforcing metal. Subsequently, the exposed plating electrode 640 is removed to electrically isolate each spring probe (FIG. 6(E)), which are then accessed using signal routing electrode 645.

Figure 7:
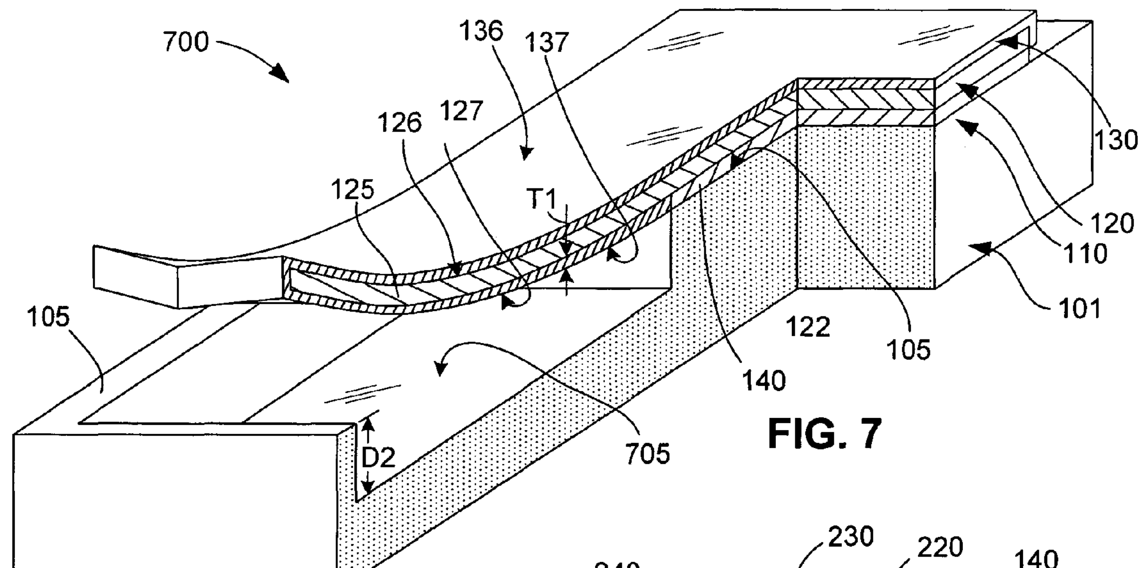
FIG. 7 is a cut-away perspective view of a high force metal plated spring structure according to another embodiment of the present invention.

FIG. 7 is a cut-away perspective view showing a spring probe (structure) 700 according to another embodiment of the present invention. Elements of spring probe 700 that are similar to those described above are identified with like reference numbers.

Similar to previous embodiments, spring probe 700 includes a spring metal finger 120 having an anchor portion 122 attached to an upper surface 105 of a substrate 101, and spring metal finger 120 has a free portion 125 extending over substrate 101. In addition, a plated metal layer 130 is formed on both an upper surface 136 and a lower surface 137 of spring metal finger 120 in the manner similar to that described above. However, unlike previous embodiments that utilize a post to provide a clearance between anchor portion 122 and substrate 101, substrate 101 defines a trench 705 located below free portion 125 of spring metal finger 120. As indicated in FIG. 7, trench 705 has a depth D2 (e.g., several microns) that provides a clearance of many microns underneath free portion 125, and is formed such that, when free portion 125 is deflected toward the substrate during a probe operation, free portion 125 enters trench 705 without contacting upper surface 105. Similar to previous embodiments, the depth D2 is preferably two or more times larger than the thickness T1 of plated metal layer 130.

Figure 8A:
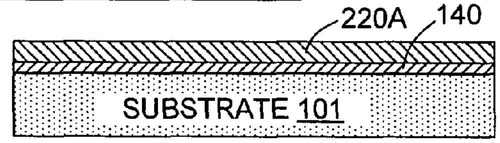
FIGS. 8(A), 8(B), 8(C), and 8(D) are cross-sectional side views showing fabrication steps associated with the production of the spring structure shown in FIG. 7 according to a specific embodiment.
Figure 8B:
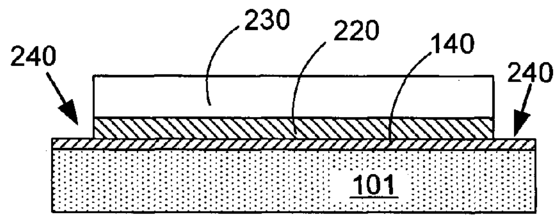
Figure 8C:
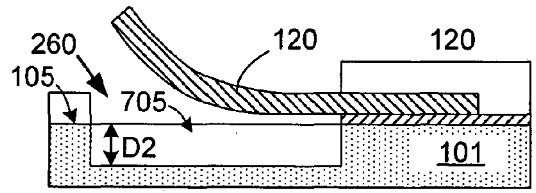
Figure 8D:
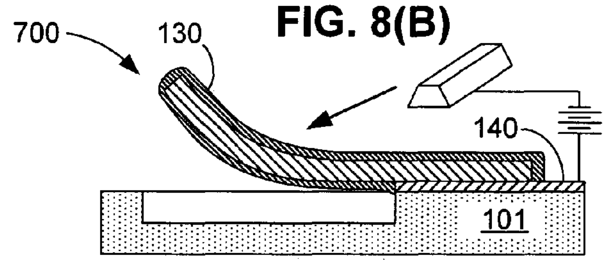

FIGS. 8(A) through 8(D) depict process steps associated with the fabrication of spring probe 700. Referring to FIGS. 8(A) and 8(B), a stressy metal film 220A is formed on an optional plating electrode/release layer 140, and then the stressy metal film is etched using a release mask 230 and a first etchant 240 to form a spring metal island 220 in a manner similar to that described above. As indicated in FIG. 8(C), a free portion 125 the spring metal island is released using a suitable mask and an etchant 260, and trench 705 is etched through upper surface 105 of substrate 101. In one embodiment, trench 705 is isotropically etched into substrate 101 during (or after) the release operation using, for example, xenon diflouride as release etchant 260. Plating electrode 140 is then contacted by the cathode of a plating system (FIG. 8(D)) in the manner described above, and all exposed surfaces of spring metal finger 120 are electroplated with plated metal layer 130.

Figure 9A:
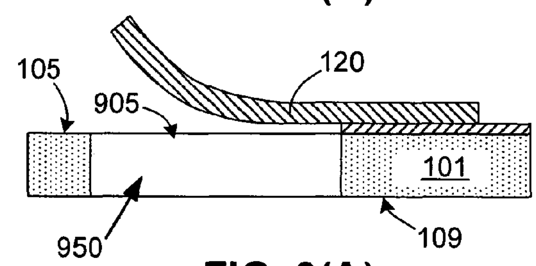
FIGS. 9(A) and 9(B) are cross-sectional side views showing fabrication steps associated with the production of a spring structure according to another specific embodiment.
Figure 9B:
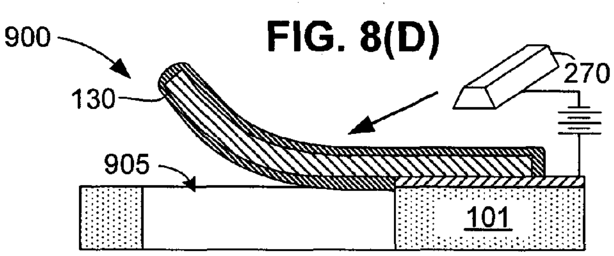

FIGS. 9(A) and 9(B) depict alternative process steps associated with the fabrication of a spring probe (structure) 900 in which a trench 905 is formed in substrate 101 by isotropic etching through a bottom surface 109 using a suitable etchant 950 (e.g., xenon diflouride). Alternatively, plasma etching, which can be anisotropic, may be used. As indicated in FIG. 9(B), electroplating of spring metal finger 120 is then performed using the techniques described above. In addition to forming a plating clearance, this backside etching approach provides visible access to the springs from the backside through trench 905 that could aid in alignment to samples for probing. Wet or plasma based etching of silicon is currently capable of through-silicon substrate etches.

Figure 10A:
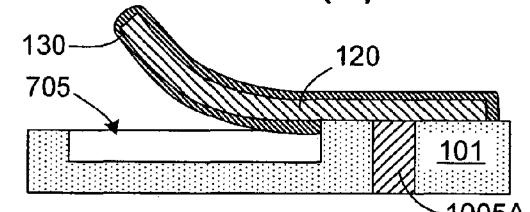
FIGS. 10(A) and 10(B) are cross-sectional side views showing spring structures according to further specific embodiments.
Figure 10B:
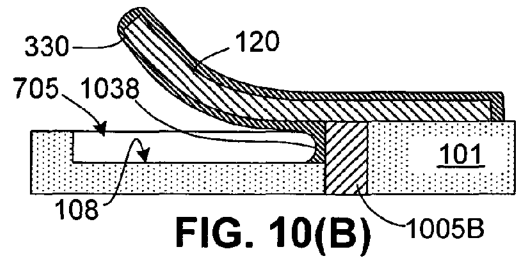

FIGS. 10(A) and 10(B) depict alternative spring probe arrangements that include trench 705, and utilize an embedded electrode to perform the electroplating process. In FIG. 10(A), a plating electrode 1005A extends through substrate 101 and contacts the anchor portion of spring metal finger 120 during the plating process. This approaches simplifies the plating process because plating electrode 1005A is already patterned and isolated from the plating solution. Therefore, the spring probe can be dipped into the plating solution while the backside contacts remain out of the solution. In contrast, when plating electrodes are formed on the substrate surface in the manner described above, careful masking and patterning is required, and at least part of the electrode must be removed after plating is completed. FIG. 10(B) shows another spring probe in which a portion of a through-substrate electrode 1005B is exposed during the trench etching process. The exposed portion of electrode 1005B causes plating material to form a curved plating structure 1038 extending from a bottom surface 108 of trench 705 to the lower surface of spring metal finger 120. The benefits of curved plating structure 1038 are similar to those described above with reference to FIG. 3.

FIGS. 11(A) through 11(D) depict process steps associated with the fabrication of a spring structure including a knee structure that provides a clearance for plated metal according to another embodiment of the present invention.

Figure 11A:
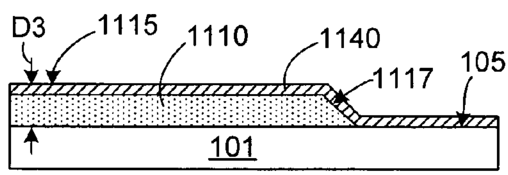
FIGS. 11(A), 11(B), 11(C), and 11(D) are cross-sectional side views showing fabrication steps associated with the production of a spring structure having a knee structure according to another embodiment of the present invention.

Referring to FIG. 11(A), a sacrificial layer 1110 is formed on upper surface of substrate 105, and an optional electrode/release layer 1140 is formed thereon. Sacrificial layer 1110 includes a planarized upper surface 1115 that is displaced from the first surface of the substrate by a predetermined distance D3, and a tapered edge section 1117 extending downward at an angle from upper surface 1115 to an exposed portion of surface 105. Requirements and possible materials for sacrificial layer 1110 are similar to those described above with reference to the embodiments disclosed in FIG. 1. Conductive sacrificial materials described in some previous embodiments may also be used. Tapered edge 1117 is provided to facilitate step coverage for the subsequent sputtered stressy metal film. One method for achieving tapered edge 1117 is to tune the passivation and etch aggressiveness of a plasma etch. This procedure is commonly done in the semiconductor industry to enable filling of high-aspect ratio contact vias.

Figure 11B:
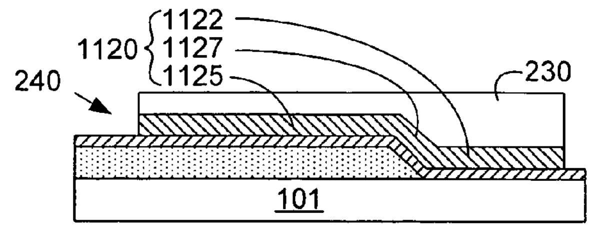

As indicated in FIG. 11(B), a stressy metal film and an optional seed layer (not shown) are then formed over sacrificial layer 1110, which is then etched using a release mask 230 and a first etchant 240 to form a spring metal island 1120 in a manner similar to that described above. Note that photoresist mask 230 is formed thick enough to mask tapered edge 1117 of sacrificial layer 1110. Note also that spring metal island 1120 is formed over tapered edge 1117 such that an anchor portion 1122 is formed over the exposed portion of substrate 101, a free portion 1125 is formed on the planarized upper surface 1115 of sacrificial layer 1110, and an intermediate portion 1127 formed on tapered edge 1117 such that it is connected between anchor portion 1122 and free portion 1125. Because intermediate portion 1127 is formed on tapered edge 1117, it is formed at the same angle as that defined by tapered edge 1117.

Figure 11C:
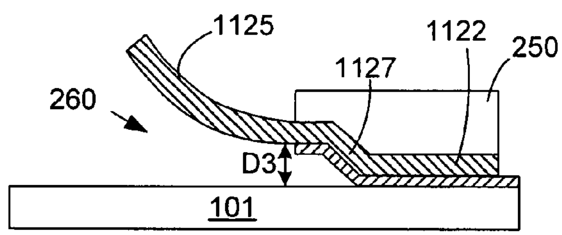

Referring to FIG. 11(C), free portion 1125 is then released using a release mask 250 and a release etchant 260 using methods similar to those described above to form a spring metal finger. In one embodiment, the release process involves removing release material from beneath free portion 1125 using a first etchant, and then isotropically etching the sacrificial layer to clear the underside of intermediate portion 1127. As in previous embodiments, anchor portion of 1122 remains connected to substrate 101, and the internal stress variations provided in the stressy metal cause free portion 1125 to bend upward away from substrate 101 upon release. Note that the fixed end of free portion 1125 is coupled to the upper end of intermediate portion 1127, thereby maintaining free portion 1127 at predetermined distance D3 from upper surface 105.

Figure 11D:
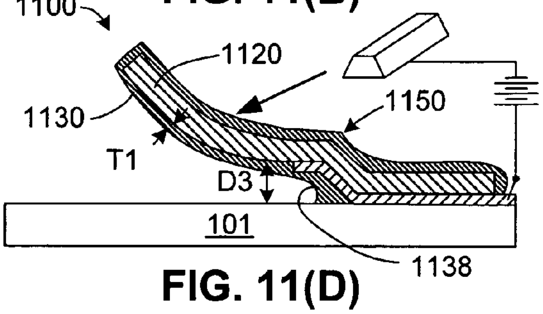

Referring to FIG. 11(D), electroplating is then performed using the system described above. In one embodiment, electroplating is performed with the release mask in place and using release/plating electrode 140 and gold as a plating seed layer. Plating along intermediate portion 1127 is critical for strength and support in this design. If electrode/release layer 140 provides a satisfactory seed layer (as depicted in FIG. 11(D)), then plated metal will stiffen the knee and form a curved plated structure 1138 under intermediate portion 1127. If electrode/release layer 140 is not a satisfactory seed layer, the release etch can be repeated after the thick sacrificial layer etch and before the electroplating process. Thickening the thus-formed knee structure 1150 with a plated metal layer 1130 having a thickness T1 increases the stiffness while keeping peak stresses low. Note that, even if thickness T1 is less than predetermined distance D3, it is possible to form a wedge at the intersection of intermediate portion 1127 and anchor portion 1122. This wedge could cause premature fracture as it does in the conventional spring structures. However, the top of the knee structure (i.e., at the junction between intermediate portion 1127 and free portion 1125) is expected to absorb the majority of the stress when the tip of spring structure 1100 is deflected toward substrate 101.

Figure 12A:
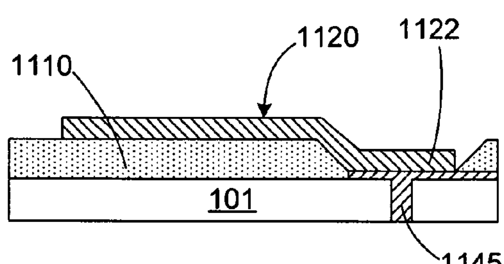
FIGS. 12(A) and 12(B) are cross-sectional side views showing fabrication steps associated with the production of a spring structure having a knee structure according to another embodiment of the present invention.
Figure 12B:
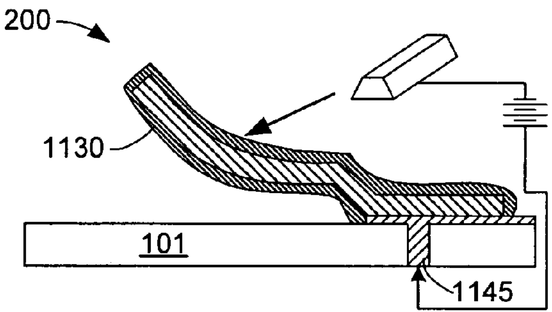

FIGS. 12(A) and 12(B) depict alternative process steps associated with the fabrication of a spring structure 1200 in which an embedded contact 1145 is formed in substrate 101 below anchor portion 1122 to facilitate the plating process in the manner described above. In this embodiment, embedded contact 1145 is exposed during the patterning of sacrificial layer 1110, and contacted from an underside of substrate 101 during the formation of plated metal layer 1130.

FIGS. 13(A) through 13(D) depict process steps associated with the fabrication of a spring structure including a knee structure according to another embodiment of the present invention.

Figure 13A:
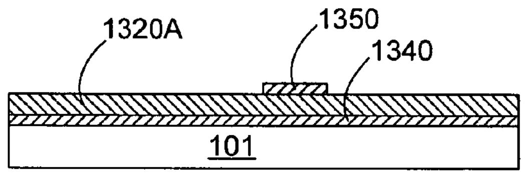
FIGS. 13(A), 13(B), 13(C), and 13(D) are cross-sectional side views showing fabrication steps associated with the production of a spring structure having a knee structure according to another embodiment of the present invention.

Referring to FIG. 13(A), the process begins by forming a layered structure including an optional electrode/release layer 1340, a spring metal island 1320A having a first stress gradient in the growth direction (i.e., compressive layers on the bottom and tensile layers on top), and a stress-balancing pad 1350 formed on the spring metal finger and having a second stress gradient that differs from the first stress gradient such that bending of spring metal finger 1320 is resisted adjacent to stress-balancing pad 1350. In one specific embodiment, stress-balancing pad 1350 is formed from a relatively thick (i.e., thicker than spring metal island 1320) section of stressy metal including only highly compressive layers. In another specific embodiment, the second stress gradient of the stress-balancing pad 1350 is opposite to the first stress gradient (i.e., tensile layers on the bottom and compressive layers on top). Stress-balancing pad 1350 may be formed using sputtered MoCr (deposited at low pressure) or aluminum. One challenge is to etch stress-balancing pad 1350 without etching the underlying spring metal island 1320. In one specific embodiment, timed etching is used to avoid etching spring metal island 1320, especially when the etch used is selective to spring metal island 1320. In another embodiment, a thin intermediate layer (not shown) is provided between the spring metal island 1320 and stress-balancing pad 1350 to act as an etch stop. Preferably, stress-balancing pad 1350 is selected to also function as a plating seed layer.

Figure 13B:
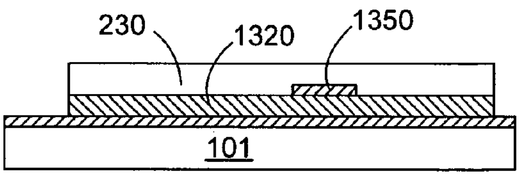

As indicated in FIG. 13(B), the layered structure is then etched using a release mask 230 and a suitable etchant to form a spring metal island 1320 in a manner similar to that described above.

Figure 13C:
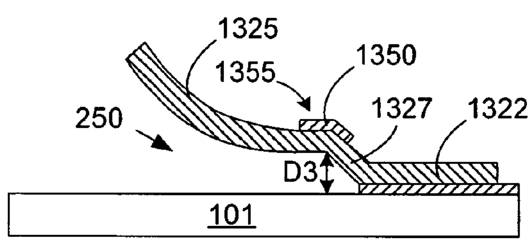

Next, as shown in FIG. 13(C), free portion 1325 is then released using the methods described above with respect to FIG. 11(C). Upon etching the release layer, free portion 1325 curls (bends) upward while the region located under stress-balancing pad 1325 curls down, thereby forming a knee structure 1355.

Figure 13D:
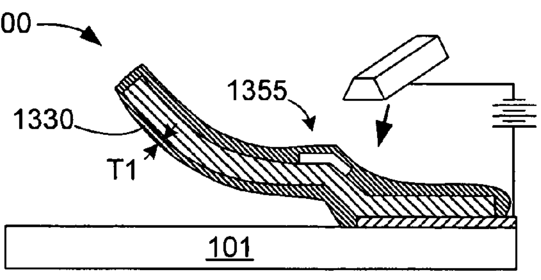
Figure 14A:
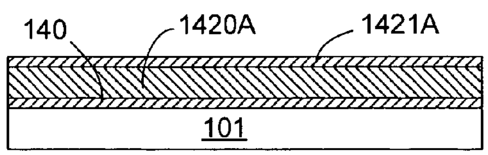
FIGS. 14(A), 14(B), 14(C), and 14(D) are cross-sectional side views showing fabrication steps associated with the production of a spring structure having a single-sided plating arrangement according to another embodiment of the present invention.
Figure 14B:
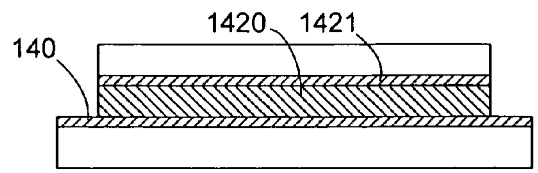
Figure 14C:
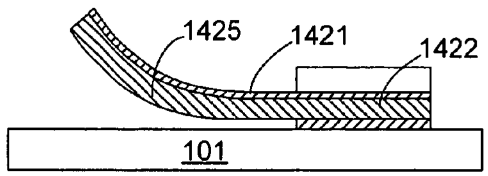
Figure 14D:
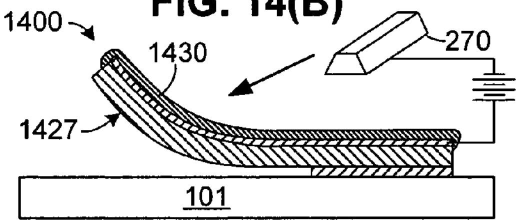
Figure 15A:
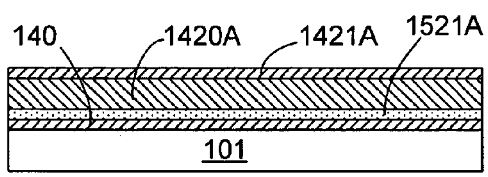
FIGS. 15(A), 15(B), 15(C), and 15(D) are cross-sectional side views showing fabrication steps associated with the production of a spring structure having a single-sided plating arrangement according to another embodiment of the present invention.
Figure 15B:
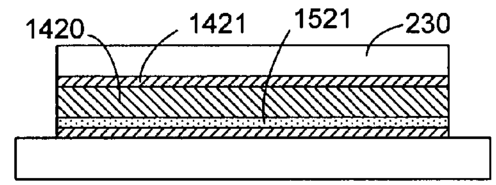
Figure 15C:
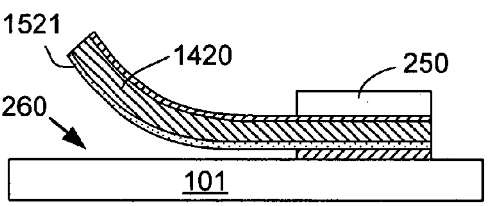
Figure 15D:
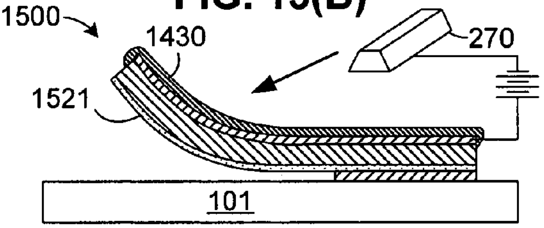

Finally, as indicated in FIG. 13(D), plating is performed in a manner similar to that described above. As with the previous embodiment, plated metal layer 1330 is formed on both the top and bottom of knee structure 1355 to maximize the strength of spring structure 1300. If stress-balancing pad 1350 does not satisfactorily seed plated metal layer 1330, then a separate seed layer can be deposited.

All of the above embodiments disclose forming high-force springs having plating on both upper and lower surfaces of the spring metal finger, and a clearance is provided to avoid the formation of a wedge. Another strategy for removing the plating wedge on the bottom side of the spring is to only plate the top surface of the spring metal finger. Specifically, as disclosed in the following embodiments, top-only plating is accomplished provides high-plating selectivity between the top and bottom surfaces of the spring metal finger by placing a plating seed layer on the top surface, and/or placing a non-plating layer on the back side of the spring metal finger.

FIGS. 14(A) through 14(D) depict a first series of fabrication steps for producing a spring structure 1400 having top-only plated metal layer 1430. Starting at FIG. 14(A), a stressy metal film 1420A is formed on a electrode/release layer 140 in the manner described above, and a seed layer 1421A is deposited (e.g., sputtered) on stressy metal film 1420A. In one embodiment, stressy metal film 1420A is MoCr, and seed layer 1421A is gold (as is the subsequently formed plated metal layer 1430). Because MoCr is a poor conductor and does not plate well, an underside non-plating layer is not provided in the current embodiment. A spring metal island 1420 (FIG. 14(B)) is then formed using the methods described above, and then free portion 1425 is released with seed layer 1421 formed thereon (FIG. 14(C)). Finally, plating is performed (FIG. 14(D)) using conventional techniques. Note that seed layer 1421 facilitates the formation of plated metal layer 1430 only on the upper surface of spring metal finger 1420, whereas the poor conductivity of the MoCr prevent significant plating on lower surface 1427.

FIGS. 15(A) through 15(D) depict a second series of fabrication steps for producing a spring structure 1500 having top-only plated metal layer 1430, as in the previous embodiment. As in the previous embodiment, the challenge is to satisfactorily prevent plating on the bottom of spring metal finger 1420 near anchor portion 1422. If the bottom side of free portion 1425 is not sufficiently immune from plating, a thin non-plating layer 1521A, such as a dielectric, is formed between stressy metal film 1420A and electrode/release layer 140 (FIG. 15(A)), and seed layer 1421A is formed stressy metal film 1420A. The design of non-plating layer 1521A depends on the overall spring release design. If the stress provided in spring metal finger 1420 alone is used to determine the release height, a thin, low-stress dielectric layer is preferred. If both non-plating layer 1521A and spring metal island 1420 are used to determine the release height, a thicker and perhaps compressive non-plating layer 1521A would be preferred. Non-plating layer 1521A should also be compatible with the release etch 260 (FIG. 15(C). For example, if a thin silicon dioxide layer is used for non-plating layer 1521A, a silicon release layer 140 etched using xenon diflouride would be appropriate. Unless electroless plating is used, this approach might require a patterned release layer so that electrical contact can be made between the springs to the plating electrode (i.e., the through-substrate contact vias described in earlier embodiments). In another embodiment, oxidized metal could be used to form non-plating layer 1521. In yet another embodiment, a thin Ti layer could be used to form non-plating layer 1521A, and Si used to form release layer 140. With a gold seed layer 1421, plated metal layer 1430 deposits only on the topside of spring metal finger 1420, and the Ti oxide of non-plating layer 1521A protects the backside from being plated. Cr or another oxide forming metal might also be used instead of Ti to form non-plating layer 1521.

Figure 16A:
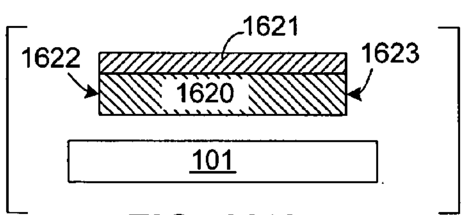
FIGS. 16(A) and 16(B) are cross-sectional end views showing portions of a spring structure having a single-sided plating arrangement formed with a continuous seed layer.
Figure 17A:
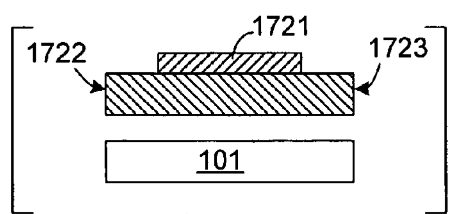
FIGS. 17(A) and 17(B) are cross-sectional end views showing portions of a spring structure having a single-sided plating arrangement formed with a centered seed layer according to another embodiment of the present invention.
Figure 16B:
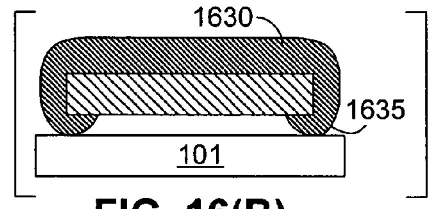
Figure 17B:
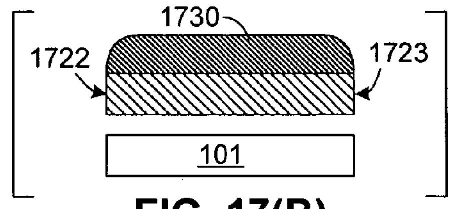

As indicated in FIGS. 16(A) and 16(B), when plating on a seed layer 1621 for one-sided plating, laboratory results show that sometimes plating 1630 can creep along the side edges 1622 an 1623 of a spring metal finger 1620 and form depending sections 1635 between spring metal finger 1620 and an underlying substrate 101 and act as wedge structures. As indicated in FIG. 17(A), according to another embodiment of the present invention, to prevent the formation of these depending plated sections, a seed layer 1721 is patterned between edges 1722 and 1723 of a spring metal finger 1720. This arrangement can be achieved by using a separate mask to pattern seed layer 1721 before plating. The seed layer etch should be selective to etching of spring metal finger 1720. By forming seed layer 1721 inside of edges 1722 and 1723 (as opposed to being formed up to the edges, as shown in FIG. 16(A)), the resulting plating process produces a plated metal layer 1730 that is formed only on the upper surface, which shown in 17(B). An alternative embodiment that avoids the cost of an extra mask involves overetching the seed layer with a selective etch with the spring mask in place. This laterally recesses the seed layer so that potential lateral plating does not result in wedge formation under the spring.

Figure 18A:
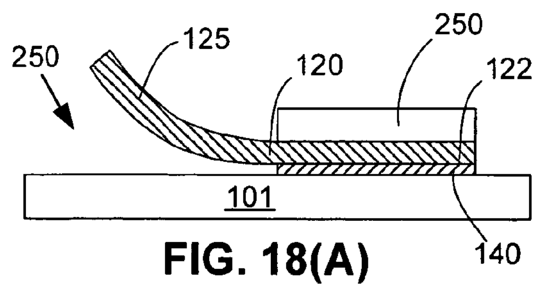
FIGS. 18(A), 18(B), 18(C), 18(D), and 18(E) are cross-sectional side views showing fabrication steps associated with the production of a spring structure according to yet another embodiment of the present invention.
Figure 18B:
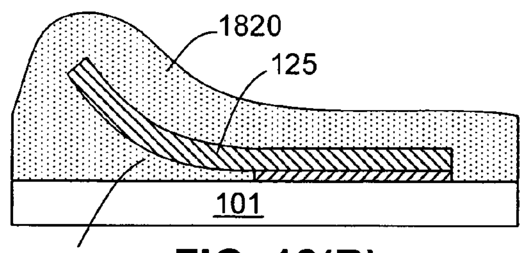
Figure 18C:
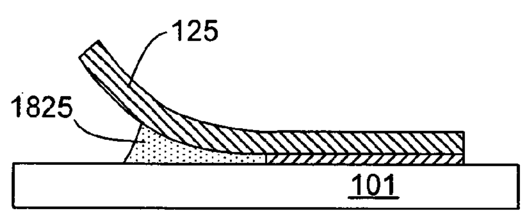
Figure 18D:
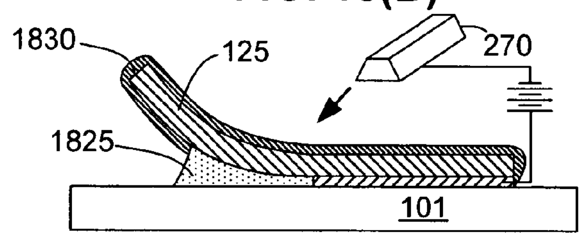
Figure 18E:
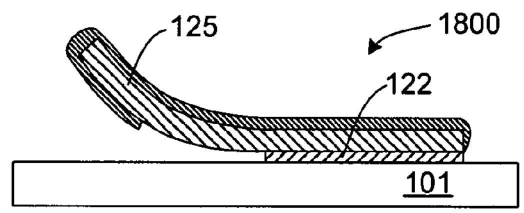
Figure 20A:
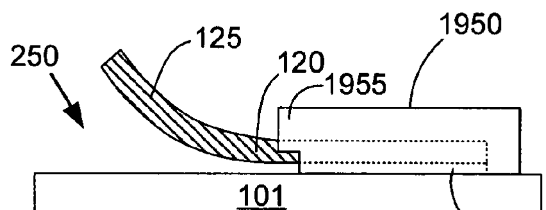
FIGS. 20(A), 20(B), and 20(C) are cross-sectional side views showing fabrication steps associated with the production of a spring structure using the release mask shown in FIG. 19.
Figure 19:
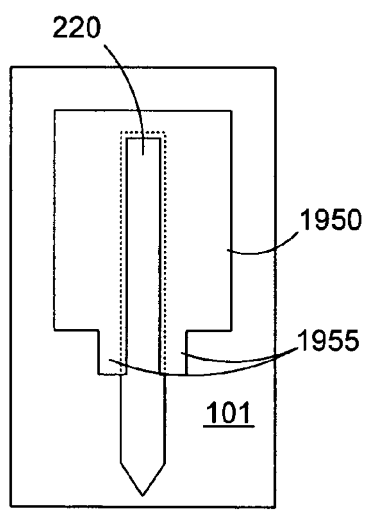
FIG. 19 is a plan view showing a spring structure having a release mask formed thereon according to another embodiment of the present invention.
Figure 20B:
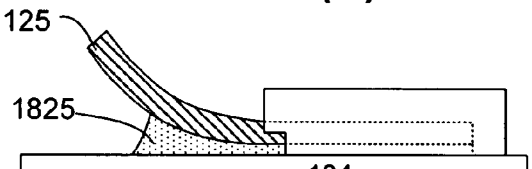
Figure 20C:
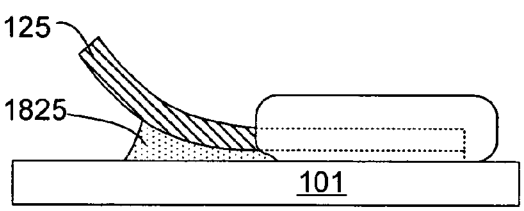

FIGS. 18(A) through 18(E) depict a method for fabricating a spring structure 1800 on a substrate 101 in which plating is prevented from forming in the region typically resulting in the wedge problem discussed above. Referring to FIG. 18(A), free portion 125 is released from substrate 101 using a release mask 250 and release etchant 160 according to the methods described above, thereby producing spring metal finger 120. As shown in FIG. 18(B), photoresist 1820 is then deposited on substrate 101 such that it covers spring metal finger 120, and such that a resist portion 1825 is located between free portion 125 and substrate 101. Subsequently, spring metal finger 120 (specifically, free portion 125) is used as a photomask, shadowing resist portion 1825 during subsequent development and removal (FIG. 18(C)). In addition to less exposure to UV light, resist trapped under free portion 125 is thicker than spun-on resist at the planar areas, and like wafer edge beads, this resist develops slower and remains behind even after the planar areas have developed out. If the resist is of the positive type, the resist that is exposed to the light will be removed during the develop step, leaving behind resist portion 1825 that masks the underside of spring metal finger 120 adjacent to anchor portion 122 during the subsequent plating process (FIG. 18(D)). Because spring metal finger 120 is used as a shadow mask, the process is self-aligning, and no expensive lithography tool is needed, only a uniform collimated light source (even this requirement may not be necessary. Finally, as indicated in FIG. 18(E), the resist portion is removed from beneath free portion 125, thereby facilitating probing operations while avoiding the wedge problem associated with conventional spring structures.

In some embodiments, it may be desirable to retain resist from the release operation to prevent plating on the sides of spring metal finger 120. For example, as indicated in FIGS. 19 and 20(A) through 20(C), a release window mask 1950 (i.e., resist) may be used as a plating mask during the subsequent plating process. Mask 1950 helps to define plating onto the unlifted spring metal, as well as portions of the top surface of the lifted spring. To prevent plating on the edges and underside of spring metal finger 120 near anchor portion 122, overhanging tabs 1955 of mask 1950 (resist) are provided on the top surface of spring metal finger 120 (FIGS. 19 and 20(A)). After the subsequent formation of resist portion 1825, mask 1950 is reflowed such that the tabs 1955 join together with resist portions 1825 to mask the sides of spring metal finger 120. A variety of resists and processes are available to enable resist fixing. In the present embodiment, image reversal was used to fix the release window resist. Another possibility would be to hard bake the first layer resist. Hardbaking at the appropriate temperature would make the resist immune to developer, while still allowing it to be removed with a resist stripper.

The embodiment described above with reference to FIGS. 18(A) through 20(C) was reduced to practice by the present inventors. A wafer including an array of springs was flood exposed after releasing the springs. The release mask was then image reversed using an ammonia reversal bake. Shipley 1818 photoresist was then spun at 3 Krpm with gradual ramp (the gradual ramp ensures a sumptuous amount of trapped resist at spring undersides). The wafer was then baked on a hotplate for 7 minutes. Next, the resist was flood exposed under an intense UV lamp for 3 minutes and then developed in a 1 water/1 microposit developer concentrate mixture for 7 minutes. The springs were then plated using the conductive underlying release metal as a common electrode. All resist was then removed from the wafer, and the underlying electrode is cleared.

An extension to the above embodiment is to replace the basal resist with a photodefinable elastomer that remains part of the spring structure after processing. The elastomer acts to distribute the stresses around the base of the spring to prevent spring base detachment. This concept was tested by compressing a spring with the photoresist base remaining in place. The spring did not detach, even though the compression forces bent the metal spring. Therefore, this embodiment provides a way to put a photodefinable material at the basal underside of a bent beam cantilever. This permits much stiffer, and stronger spring structures to be made than are otherwise possible. This embodiment also permits making high force springs without additional photomasks or alignment steps, thereby lowering production costs.

Spring probe tip design is important in probing applications using high-force springs. The present assignee has already studied the dependence of in-plane tip shape on the effective stiffness of the spring. In addition, the tip shape at the end of the spring can alter the contact area and thus the contact force required for making reliable low-resistance electrical contact to a pad. Sharp tips can increase contact pressure for a given force, but also need to have enough area for low contact resistance. Conversely, very blunt tips provide a large contact region, but with reduced contact pressure for a given force, which might not be sufficient for breaking through barriers such as native oxide on aluminum. An optimal tip design will depend on balancing these effects.

Figure 21A:
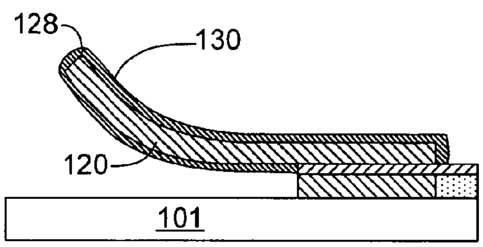
FIGS. 21(A) and 21(B) are cross-sectional side views showing spring structures having alternative tip structures formed in accordance with another aspect of the present invention.
Figure 21B:
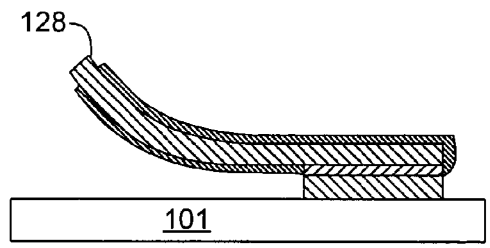

As indicated in FIG. 21(A), the formation of plated metal layer 130 to stiffen spring metal finger 120 can round (blunt) the tips 128, reducing the contact pressure, and thus the ability to make reliable electrical contact. As indicated in FIG. 21(B), for all of the approaches described above, optimal tip design might require restricting electroplating on tip 128 (e.g., by omitting seed material at the tip), or sharpening tip 128 after plating using known techniques to prevent rounding and to provide a suitably sharp point. For example, laboratory results suggest that electroless plating of nickel on MoCr springs encased in gold seed layers forms springs which are plated along the length of the springs, but not at the tip.

Figure 22A:
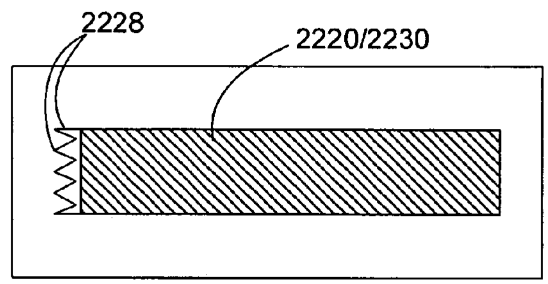
FIGS. 22(A) and 22(B) are plan and cross-sectional side views, respectively, showing a spring structure having a multi-tip structure according to another embodiment of the present invention.
Figure 22B:
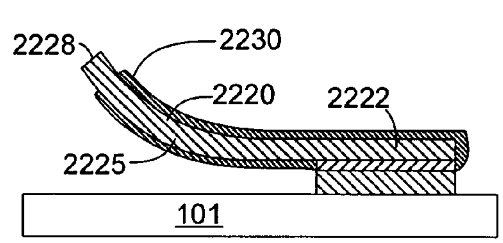

As indicated in FIGS. 22(A) and 22(B), another approach for providing high-force tip design on spring probes is to form multiple tips 2228 on each spring metal finger 2220. Such in-plane tips can be formed using the spring metal mask (e.g., mask 230; see FIG. 1). Multiple tips 2228 increase the conductivity of small area contacts through parallelism, as well as increase the chance of making contact through redundancy. The formation of plated metal 2230 on multiple tips 2228 is prevented using the methods described above.

Figure 23A:
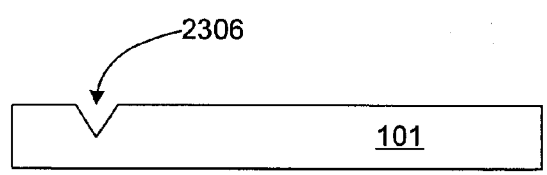
FIGS. 23(A), 23(B), 23(C), and 23(D) are cross-sectional side views showing fabrication steps associated with the production of a spring structure having an out-of-plane tip structure according to another embodiment of the present invention.
Figure 23B:
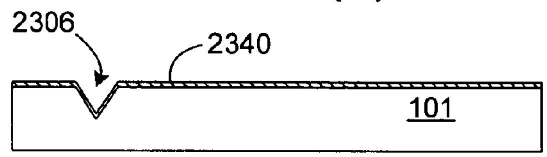
Figure 23C:
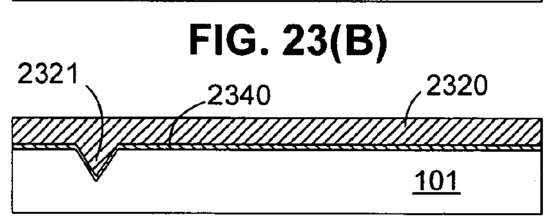
Figure 23D:
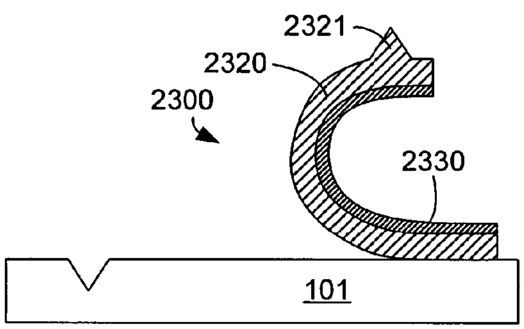

FIGS. 23(A) through 23(D) are cross-sectional side views showing a method for forming an out-of-plane tip 2321 on a spring probe 2300. Out-of-plane tip 2321 is formed by etching a sharp pit 2306 into substrate 101 (FIG. 23(A)), which is accomplished with wet chemical etching of silicon along selective crystal planes. Release material layer 2340 is then deposit on substrate 101 such that it enters pit 2306 (FIG. 23(B)). Spring metal island 2320 is then formed and etched according to the methods described above, with a portion of the stressy metal entering the pit to form an out-of-plane tip 2321 (FIG. 23(C)). Note that another metal (i.e., other than the stressy metal) can be placed into the pit to form out-of-plane tip 2321. Finally, spring metal finger 2320 is released in a manner similar to that described above such that out-of-plane tip 2321 is pulled from pit 2306 and is oriented upward (away from substrate 101), as indicated in FIG. 23(D). Although single sided plated layer 2330 is depicted in FIG. 23(D), out-of-plane tips can be utilized with any of the two-sided plating processes described above.

Figure 24:
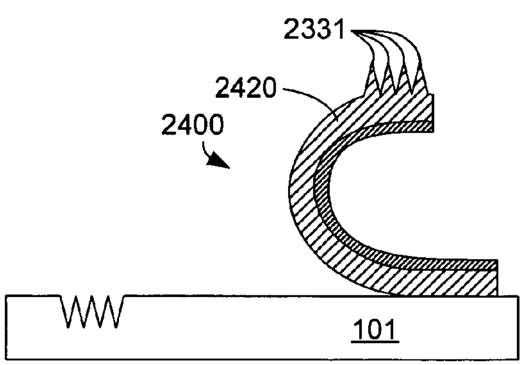
FIG. 24 is a cross-sectional side view showing a spring structure having an array of out-of-plane tips according to another embodiment of the present invention.

Out-of-plane tips are an alternative to in-plane tips that allow a higher tip density because multiple rows of tips can be fabricated on each spring probe. The challenge for two-dimensional arrays of tips is to geometrically approach the contact pad so that all tips can make contact. One approach to doing this is to fabricate the out of plane tips through spring metal deposition in an etched pit, and then use stressy metal to bend the tip back so that the two-dimensional array of tips is parallel to the contact pad, as depicted in FIG. 24. The back bending structure can be plated for stiffness, and provides long curves for distributing stress and preventing fracture.

Although the present invention has been described with respect to certain specific embodiments, it will be clear to those skilled in the art that the inventive features of the present invention are applicable to other embodiments as well, all of which are intended to fall within the scope of the present invention. For example, although the present invention is specifically directed to plating formed on spring metal structures, plating may also be formed on non-metal spring structures (e.g., using a bilayer of oxide and silicon or Ga—As covered by a metal seed layer) using, for example, electroless plating techniques. Moreover, although the present invention is specifically directed to sputtered stress-engineered spring metal materials, the spring structures may also be stress-engineered utilizing other techniques. Moreover, although the present invention describes spring structures that bend away from an underlying substrate, the present invention may also be utilized in spring structures in which the tensile/compressive stress gradient is reversed, causing the released spring structure to bend toward the substrate (e.g., into a trench formed in the substrate).

The invention claimed is:

1. A spring structure formed on a substrate made from a first material and having a first surface, the spring structure comprising:

a post formed from a second material and extending from the first surface of the substrate, the post having an upper surface that is displaced from the first surface of the substrate by a predetermined distance;

a spring metal finger having an anchor portion attached to the upper surface of the post such that the anchor portion is separated from the first surface of the substrate by the predetermined distance, the spring metal finger also having a free portion extending over the substrate, the free portion having opposing first and second surfaces; and a plated metal layer including a first layer formed on the first surface of the free portion of the spring metal finger and a second layer formed on the second surface of the free portion of the spring metal finger;

wherein both the first layer and the second layer of the plated metal layer have a thickness that is both smaller than the predetermined distance, and greater than a thickness of the spring metal finger.

2. The spring structure according to claim 1, wherein the predetermined distance is greater than two times larger than the thickness of the plated metal layer.

3. The spring structure according to claim 1, wherein the post comprises at least one of copper and nickel.

4. A spring structure formed on a substrate made from a first material and having a first surface, the spring structure comprising:

a post formed from a second material and extending from the first surface of the substrate, the post having an upper surface that is displaced from the first surface of the substrate by a predetermined distance;

a spring metal finger having an anchor portion attached to the upper surface of the post such that the anchor portion is separated from the first surface of the substrate by the predetermined distance, the spring metal finger also having a free portion extending over the substrate, the free portion having opposing first and second surfaces; and a plated metal layer formed on both of the first and second surfaces of the free portion of the spring metal finger;

wherein the plated metal layer has a thickness that is smaller than the predetermined distance, and wherein the plated metal layer includes a curved portion extending from the first surface of the substrate to the free portion of the spring metal finger.

5. The spring structure according to claim 1, further comprising a plating electrode formed between the post and the spring metal finger.

6. A spring structure formed on a substrate made from a first material and having a first surface, the spring structure comprising:

a post formed from a second material and extending from the first surface of the substrate, the post having an upper surface that is displaced from the first surface of the substrate by a predetermined distance;

a spring metal finger having an anchor portion attached to the upper surface of the post such that the anchor portion is separated from the first surface of the substrate by the predetermined distance, the spring metal finger also having a free portion extending over the substrate, the free portion having opposing first and second surfaces; and a plated metal layer formed on both of the first and second surfaces of the free portion of the spring metal finger; and a release material layer formed between the upper surface of the post and the anchor portion of the spring metal finger, wherein the plated metal layer has a thickness that is smaller than the predetermined distance.

7. The spring structure according to claim 1, wherein a tip located adjacent to an end of the free portion of the spring metal finger is exposed through the plated metal.

8. The spring structure according to claim 7, wherein the tip is an out-of-plane structure extending perpendicular to a surface of the spring metal finger.

9. The spring structure according to claim 1, further comprising a plurality of tips located adjacent to an end of the free portion of the spring metal finger.

10. A spring structure formed on a substrate having a first surface, the spring structure comprising:

a spring metal finger having an anchor portion attached to the first surface of the substrate, the spring metal finger also having a free portion extending over the substrate; and a plated metal layer formed on both of the first and second surfaces of the free portion of the spring metal finger;

wherein the substrate defines a trench located below the free portion of the spring metal finger and shaped such that when the free portion of the spring metal finger is deflected toward the substrate, the free portion enters the trench without contacting the first surface of the substrate.

11. The spring structure according to claim 10, wherein the trench defines a depth, and wherein the plated metal layer has a thickness that is smaller than the depth of the trench.

12. The spring structure according to claim 11, wherein the depth is greater than two times larger than the thickness of the plated metal layer.

13. The spring structure according to claim 10, wherein the plated metal layer includes a curved portion extending from the free portion of the spring metal finger into the trench.

14. The spring structure according to claim 1, further comprising a release material layer formed between the first surface of the substrate and the anchor portion of the spring metal finger.

15. The spring structure according to claim 10, wherein a tip located adjacent to an end of the free portion of the spring metal finger is exposed through the plated metal.

16. The spring structure according to claim 15, wherein the tip is an out-of-plane structure extending perpendicular to a surface of the spring metal finger.

17. The spring structure according to claim 10, further comprising a plurality of tips located adjacent to an end of the free portion of the spring metal finger.

18. A spring structure formed on a substrate having a first surface, the spring structure comprising:

a spring metal finger including:

an anchor portion attached to the first surface of the substrate, an intermediate portion extending at a first angle from the anchor portion, the intermediate portion having a first end connected to the anchor portion and a second end located a predetermined distance away from the first surface of the substrate, and a bent free portion having a first portion extending from the second end of the intermediate portion at a second angle; and a plated metal layer formed on the free portion of the spring metal finger, wherein the plated metal layer has a thickness that is smaller than the predetermined distance.

19. The spring structure according to claim 18, wherein the predetermined distance is greater than two times larger than the thickness of the plated metal layer.

20. The spring structure according to claim 18, wherein the plated metal layer includes a curved portion extending from the first surface of the substrate along the intermediate portion to the free portion of the spring metal finger.

21. The spring structure according to claim 18, further comprising a release material layer formed between the first surface of the substrate and the anchor portion of the spring metal finger.

22. The spring structure according to claim 18, wherein the spring structure further comprises a stress-balancing pad formed on the second end of the intermediate portion and the first end of the free portion, wherein the stress-balancing pad has a second internal stress gradient that is different from the first internal stress gradient.

23. The spring structure according to claim 22, wherein the anchor portion of the spring metal finger has a first internal stress gradient including compressive layers adjacent the substrate and tensile layers adjacent the stress-balancing pad, and the stress-balancing pad has a second internal stress gradient that is different from the first internal stress gradient.

24. The spring structure according to claim 22, wherein the first internal stress gradient includes compressive layers adjacent the substrate and tensile layers adjacent the stress-balancing pad, and wherein the second internal stress gradient includes tensile layers adjacent the compressive layers of the spring metal island, and tensile layers at an upper end of the stress-balancing pad.

25. The spring structure according to claim 18, wherein a tip located adjacent to an end of the free portion of the spring metal finger is exposed through the plated metal.

26. The spring structure according to claim 18, wherein a tip located adjacent to an end of the free portion of the spring metal finger includes an out-of-plane structure extending perpendicular to a surface of the spring metal finger.

27. The spring structure according to claim 18, further comprising a plurality of tips located adjacent to an end of the free portion of the spring metal finger.

* * * * *